W. W. WOTHERSPOON.
AIR PRESSURE SYSTEM AND METHOD OF OPERATION.
APPLICATION FILED JAN. 31, 1912.
1,149,709.
Patented Aug. 10, 1915.
4 SHEETS—SHEET 1.
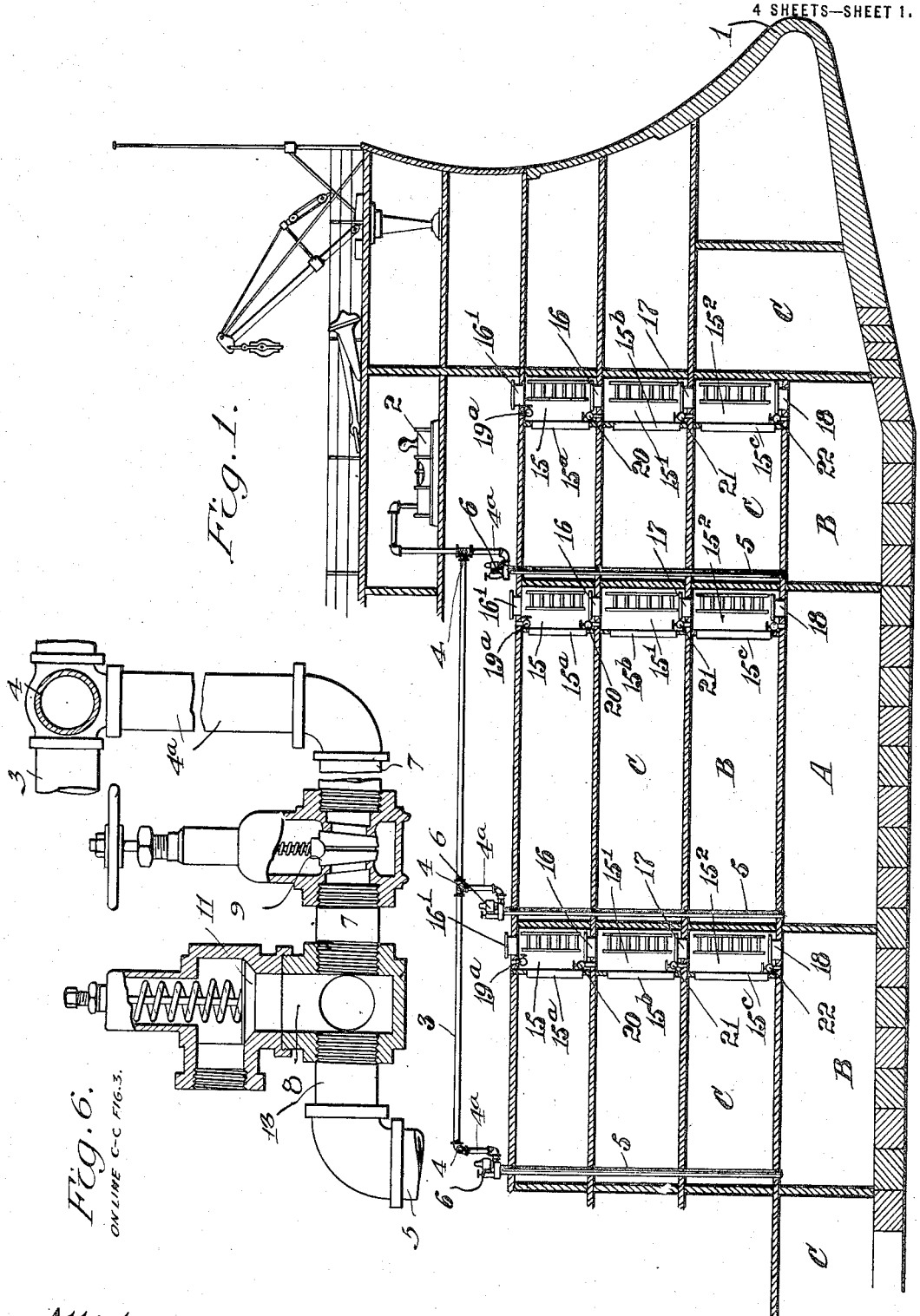

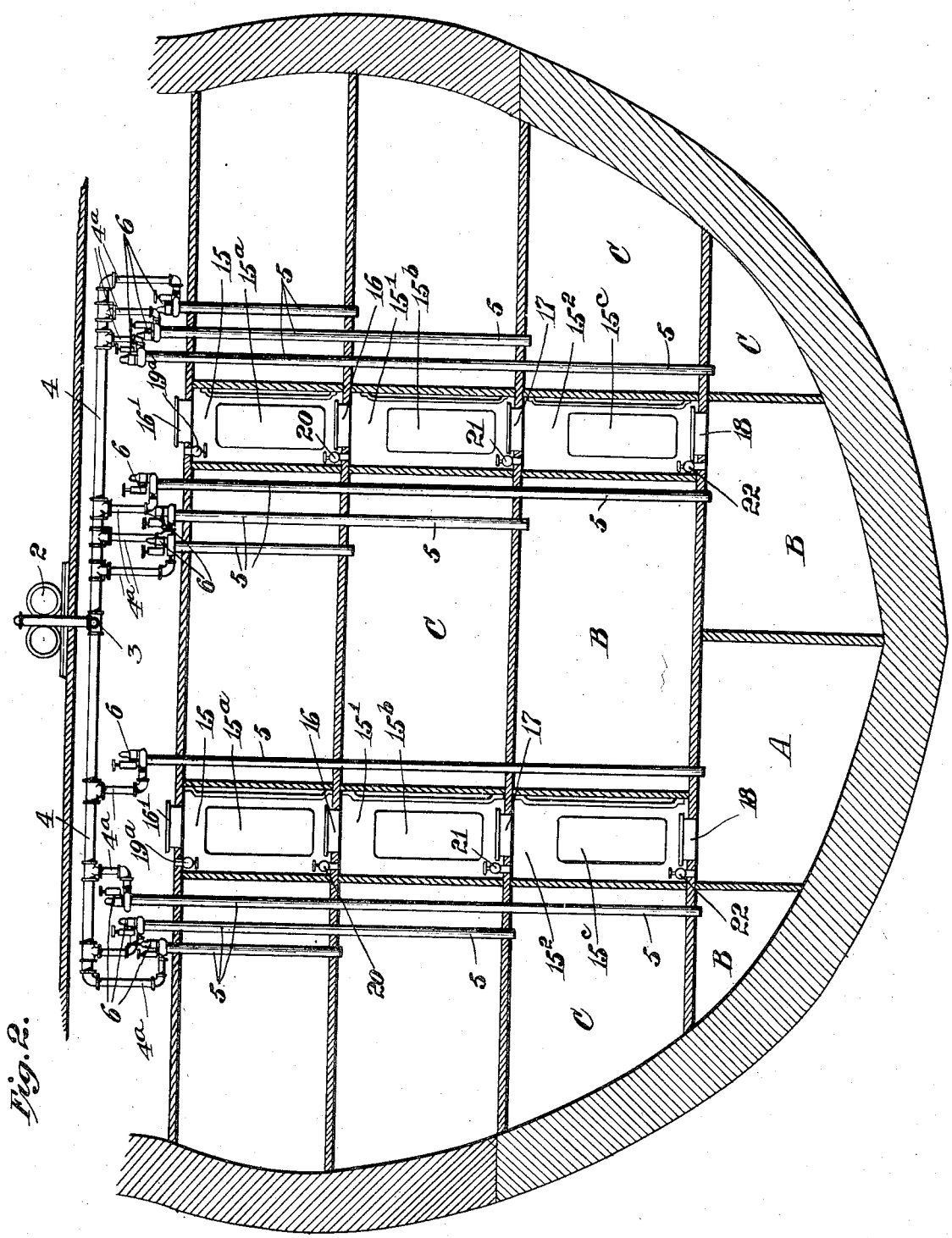

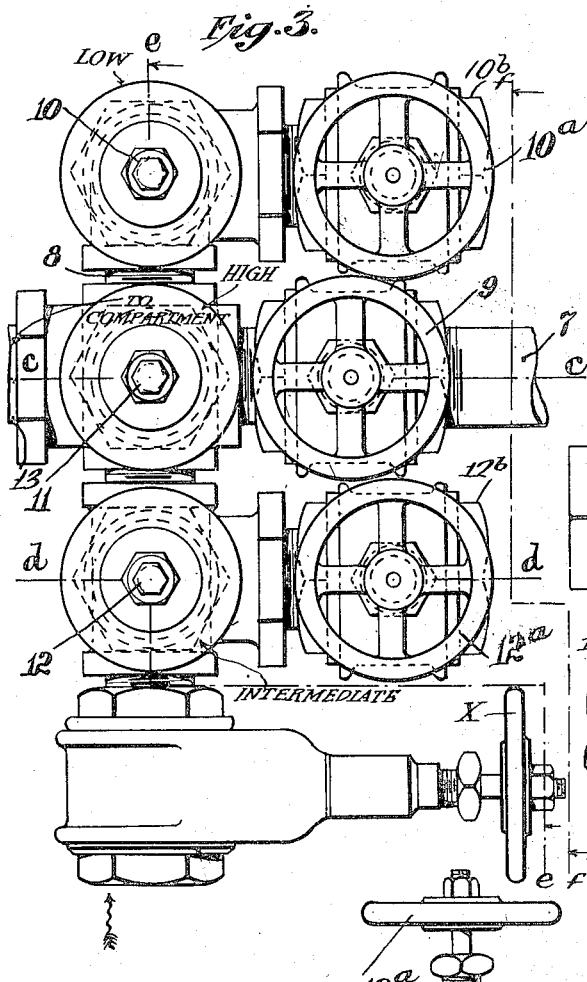
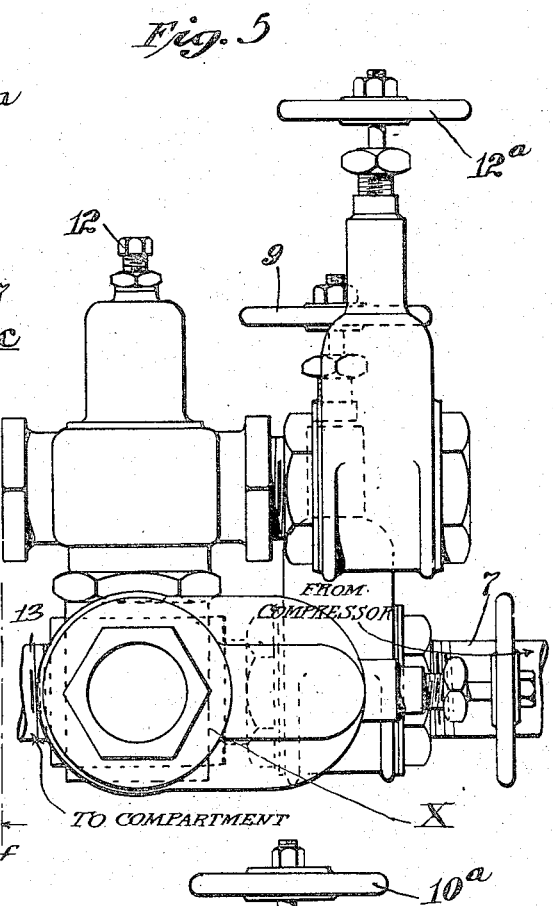
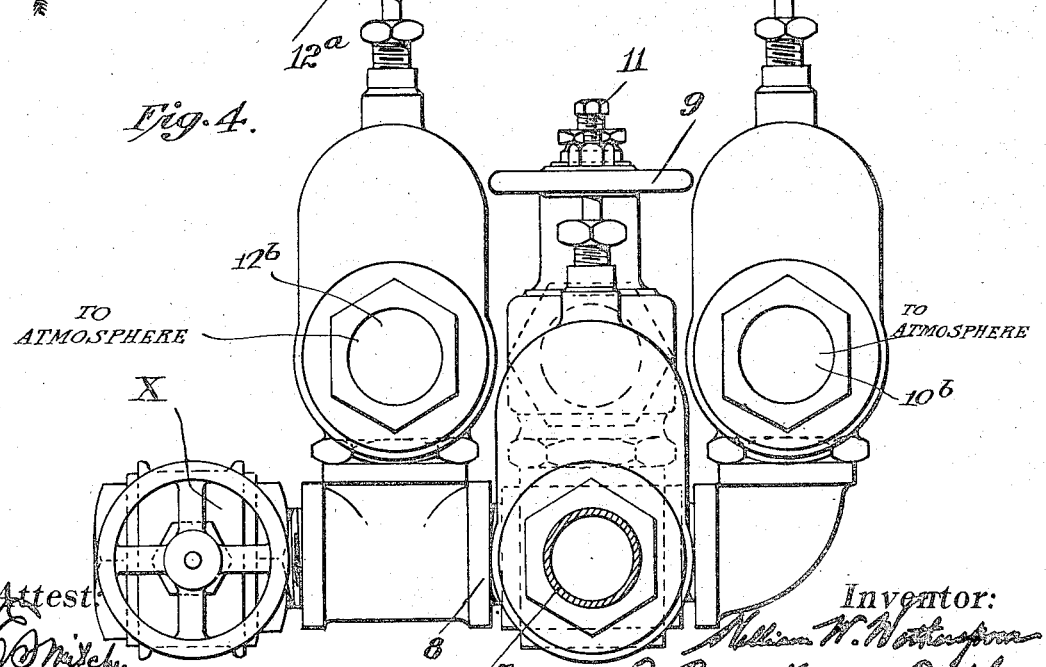

W. W. WOTHERSPOON.
AIR PRESSURE SYSTEM AND METHOD OF OPERATION.
APPLICATION FILED JAN. 31, 1912.
1,149,709.
Patented Aug. 10, 1915.
4 SHEETS—SHEET 4.
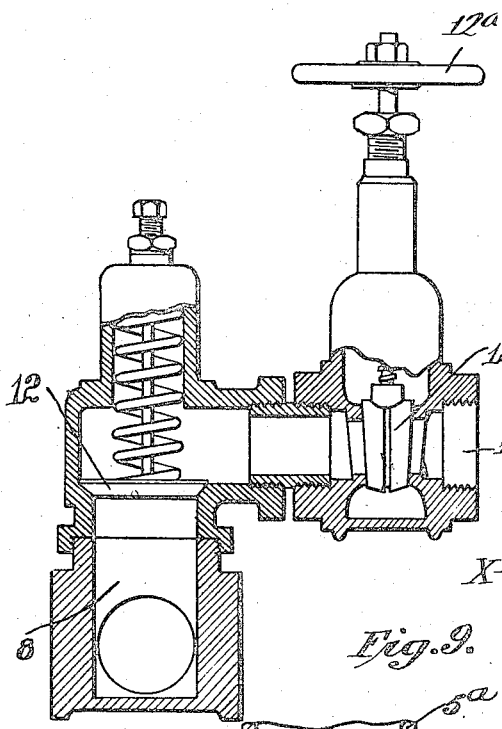
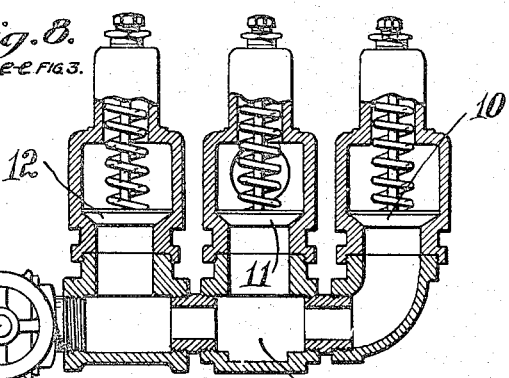
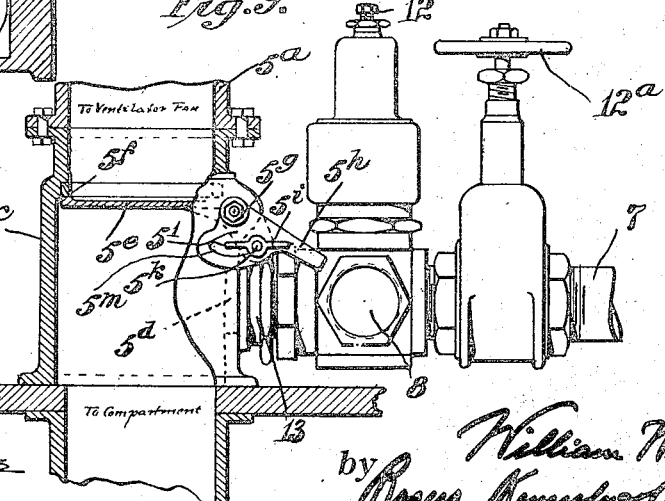
Attest:
Inventor:
William W. Wotherspoon
by Rogers, Kennedy & Campbell
his Attys.

UNITED STATES PATENT OFFICE.

WILLIAM WALLACE WOTHERSPOON, OF NEW YORK, N. Y.

AIR-PRESSURE SYSTEM AND METHOD OF OPERATION.

1,149,709.  Specification of Letters Patent.  Patented Aug. 10, 1915.

Application filed January 31, 1912. Serial No. 674,591.

*To all whom it may concern:*

Be it known that I, WILLIAM WALLACE WOTHERSPOON, a citizen of the United States, residing at New York, in the county of New York and State of New York, have invented certain new and useful Improvements in Air-Pressure Systems and Methods of Operation, of which the following is a specification, reference being had therein to the accompanying drawing.

In a certain system designed more particularly for the raising of sunken vessels, it is the practice in order to expel the water which has leaked into the hold of the vessel, to close air-tight the usual communications of said hold with the outside, and to force air under pressure therein, the hold being equipped with suitable means, such as an air lock, through which workmen may enter the hold while the pressure is maintained, and make inspection, or repairs to the leak. In the application of this system to vessels containing water-tight compartments, there is danger of the straining or rupture of the walls of the compartments, as well as the deck, in the event of a comparatively high pressure being introduced, such danger being more pronounced in the event of injury to a compartment in the vicinity of the bottom of the vessel, by reason of the greater hydrostatic head which it is necessary for the pressure to overcome.

It is the aim of the present invention to obviate this danger of injury to the compartments, and the invention consists of an improved construction by means of which a compartment which is subjected to internal air pressure, may be reinforced by the application of fluid pressure, such as air, to the outside of the compartment, in excess of atmospheric pressure.

The invention consists also in the novel method involved in the operation of these improved means.

In the accompanying drawings I have shown my invention applied to a vessel containing a series of adjoining water-tight compartments such as are commonly employed for storage of different kinds of goods and articles, for instance ammunition, supplies, fuel, and the like, means being provided for introducing air under pressure into said compartments in a controllable manner and under different degrees of pressure, according to the relative positions of the compartments, and the said compartments being equipped with air locks through which workmen may enter into the respective compartments, either for inspection of the same or for repairs, or for other purposes, and this while the pressure is maintained therein. It will be understood, however, that my invention is not limited in its application, either as a novel construction, or a novel method of procedure, to the particular form of embodiment shown, but is applicable as well to other forms and embodiments, and it will be further understood that the invention is not limited to any particular form or construction of the parts except in so far as such limitations are embodied in the claims. Further it will be understood that as far as the method of procedure involved is concerned, the same may be carried out without regard to the particular mechanism employed, which is in the present instance shown merely by way of example.

In the particular form and construction shown, the highest pressure of air necessary to expel and keep the water from an injured compartment in the bottom of the vessel, where the hydrostatic pressure is the greatest, is fourteen pounds or thereabout, and the walls of the compartments are of a strength to withstand a pressure of five pounds more or less. If, therefore, the full pressure is admitted to the injured compartment, there is danger of the walls of the same being buckled or ruptured or otherwise injured. In accordance with my invention I propose to reinforce the walls of the injured compartment by admitting to the compartments immediately surrounding the same, a reduced pressure, say a pressure of nine pounds, with the result that the walls of the injured compartment would then be subjected to a pressure acting outwardly of five pounds only; and in order to reinforce these surrounding compartments against the excessive pressure of nine pounds, I propose, in accordance with my invention, to introduce into the next outer surrounding compartments, a pressure say of four pounds. Under these conditions there will be no walls subjected to a greater pressure than would be safe for them to bear, yet the injured compartment will be standing a pressure of fourteen pounds, sufficient to overcome the hydrostatic head and expel the water. It is seen, therefore, that in accordance with my invention the compartment which is subjected internally to a high or dangerous pressure, is reinforced against the injurious strains which would result from this pressure, by the application to the outside of the compartment of a counter pressure, whereby the pressure acting against the walls of the compartment is reduced in effect to a point that may be withstood by said walls without injury thereto.

In the accompanying drawings, Figure 1 is a longitudinal section through the forward portion of a vessel divided into a number of compartments, showing the same equipped with means constructed in accordance with my invention, and suitable for carrying out the method involved; Fig. 2 is a transverse section through the same; Fig. 3 is a top plan view of one of the valve mechanisms controlling the air pressure to the respective compartments; Fig. 4 is a vertical sectional elevation on the line f—f of Fig. 3; Fig. 5 is an end view of Fig. 3 as viewed in the direction on the wavy arrow; Fig. 6 is a horizontal sectional plan view on the line c—c of Fig. 3; Fig. 7 is a vertical sectional elevation on the line d—d of Fig. 3; Fig. 8 is a similar section on the line e—e of Fig. 3; Fig. 9 is a sectional elevation showing my improved system applied in slightly modified form.

Referring to the drawings, 1 represents the bow portion of a vessel, divided as usual into a number of non-communicating watertight compartments adjoining each other both in a longitudinal and transverse direction and superposed one upon the other.

2 represents a suitable air compressor for supplying air under pressure to the different compartments. This air compressor may be located at any convenient or appropriate point, so that pipes may be led therefrom to the different compartments. In the present instance the compressor is arranged above the compartments, and there extends therefrom, a longitudinal distributing pipe 3, from which is extended at intervals and in opposite directions, a series of transverse branch pipes 4, and from these branch pipes, there are led downwardly, vertical pipes 4ª communicating in a manner presently to be described, with pipes 5 which extend different distances downwardly so as to enter the several compartments according to their locations. For instance one of the pipes 5 terminates at its lower end at the upper portion of one of the upper compartments, while the next pipe 5 terminates at its lower end so as to enter the next compartment beneath, while the third pipe 5 extends still farther downward so as to enter one of the bottom compartments, this arrangement of the pipes being observed throughout the entire series of compartments, so that each compartment will be supplied independently of the others with air from the common source of pressure.

A series 6 of pressure regulating valves, some of them being rendered operable and inoperable by cut-offs as will be more particularly described hereinafter, is interposed in each of the communications between pipes 4ª and 5; whereby the pressure in a leaking compartment may be raised to the desired degree, and the pressures in the immediate surrounding compartments to a lesser degree, and the pressures in still further remote compartments to a still less degree.

In the operation of the mechanism so far described, if there is a leak say in one of the lower compartments A, through which water has entered, and a pressure of air is to be introduced therein at say fourteen pounds, which in this instance would be sufficient to expel the water, such pressure may be maintained without injury to the walls of the compartment, by introducing into the adjoining and surrounding compartments B, a pressure say of nine pounds, and introducing into the next outer compartments C surrounding the compartments B, a pressure say of four pounds. In these circumstances and by reason of the fact that the pressures in the different zones of compartments are acting against each other through the medium of the walls of the said compartments, the walls of compartment A would be subjected to a pressure of five pounds, while the walls of compartments B would be subjected to a pressure of five pounds, and these pressures being considerably lower than the compartments are able to withstand, no injury would result therefrom, although the high pressure of fourteen pounds would be maintained in the compartment A. It is seen, therefore, that by the mechanism shown, the compartments, or more properly speaking the walls thereof, are reinforced against the tendency of the higher pressure to bulge, strain, or injure the same, the said compartments being subjected to different degrees of pressure according to their positions relative to the particular compartment in which the high pressure is to be maintained.

The valve mechanisms 6 before alluded to for providing for the introduction into the several compartments of different degrees of pressure, may be of any appropriate construction, adapted to admit through the pipes different predeterminate degrees of pressure, but I prefer to adopt the construction illustrated more particularly in Figs.

3 to 9. Here it will be seen that each of the pipes 4ª connects with a horizontal pipe 7 which in turn connects with a manifold 8 communicating by a pipe 13 with the upper end of one of the pipes 5 leading to a compartment. The manifold or chamber 8 communicates with three pressure-regulating valves, 10 a low-pressure valve, 11 a high-pressure valve, and 12 an intermediate-pressure valve, the said valves being formed as usual with a valve proper acted on by a spring of such tension that it will yield to open the valve and permit the escape of the pressure to the outside only when the predetermined pressure to be controlled is overcome. The low-pressure valve 10, and the intermediate-pressure valve 12 are provided with gate-valves 10ª and 12ª respectively, by means of which communication with the outside atmosphere through openings 10ᵇ and 12ᵇ respectively may be controlled, the closing of the said gate valves rendering the pressure valves inactive, and the opening of said gate-valves causing the pressure valves to prevent higher pressure in the manifold and connected pipe 5 than their respective springs are tensioned to control. In the setting of the valves for the admission of air to the several compartments, when the high pressure of fourteen pounds is to be admitted to compartment A, the valve mechanisms of the several compartments which are to have pressure applied are so set that a low pressure will be admitted first to all of the compartments. Then the valves are adjusted to admit the next higher pressure to compartments B; and finally the highest pressure is admitted to compartment A. This avoids the possibility of any injury to compartment A, which might result if a high pressure were admitted to the same without its walls being first reinforced by the counter pressure in the surrounding compartments. Assuming now that the compartments are to be subjected to pressure to expel the water from the injured compartment A; first the gate-valves 10ª and 12ª of the low-pressure valves 10 and intermediate-pressure valves 12 of all the compartments are opened. The pressure entering through pipe 7 will then enter the system at four pounds pressure, which is that for which the low-pressure valves are set. Next, the gate valves 10ª leading to compartments A and B are closed, with the result that pressure entering these compartments will be that as determined by the intermediate-pressure valves, namely, nine pounds. Finally, gate valve 12ª leading to compartment A, is closed, the result being that the pressure admitted to compartment A will be that controlled by the high pressure valve, namely, fourteen pounds.

From the foregoing description it will be seen that the pressure admitted to all of the compartments is in the first instance a low pressure; then while retaining the low pressure on the extreme outer compartments, that in the remaining compartments is increased to the pressure of the intermediate valves, namely, nine pounds; and finally, the pressure of the injured compartment is increased to fourteen pounds. A gate valve 9 is applied in each of the pipes 7 in order to enable the air to be cut off entirely from the different compartments when occasion demands.

At one end the manifold is provided with a blow-off valve X, by the opening of which the interior of the manifold is connected with the external air, the purpose of this valve being to relieve the compartment quickly of pressure, if for any reason it is desired to do so.

I propose to provide for the entrance of workmen into the several compartments while the pressure therein is maintained, and this I accomplish by equipping the compartments with air locks 15, 15', and 15², one lock for each compartment. As shown more particularly in Fig. 1 these air locks are arranged at the end of the compartments and are disposed in series one above the other and communicating directly with each other, so that a workman entering an air lock of an upper compartment, may by passing successively from one air lock to the next below, finally enter the lowermost compartment of the series. Each air lock communicates with its particular compartment through a side door, a door 15ª between lock 15 and its compartment, a door 15ᵇ between lock 15' and its compartment, and a door 15ᶜ between lock 15² and its compartment, so that after entering an air lock, by opening its door, access may be gained to the compartment. There is provided a door 16' at the top of the upper lock 15, a door 16 between locks 15 and 15', a door 17 between locks 15' and 15², and finally a door 18 between lock 15² and the lowermost compartment. Valves 19ª, 20, 21 and 22 are provided in the respective locks, by which the pressure in the several communicating locks may be equalized and successively increased as the lowermost compartment is approached.

Assuming now that compartment A is under fourteen pounds pressure, compartments B under nine pounds pressure, and compartments C under four pounds pressure, and it is desired to enter compartment A, and further assuming that the doors 15ª, 15ᵇ, and 15ᶜ leading from the air locks to the several compartments are open,—first, door 16 is closed and valves 20, 21 and 22 also closed, and the door 16' leading to the atmosphere opened. The workman enters by door 16' and occupies the upper lock 15, closing the door after him, and closing valve 19ª

19ᵃ. Valve 20 is now opened, thereby equalizing the pressure in this lock with that next below. Door 16 is now opened and the workman enters the next or intermediate lock 15' and closes its door 15ᵇ and door 16, at the same time closing valve 20. He next opens valve 21 which will admit the nine-pound pressure from compartment B, thereby equalizing the pressure in the intermediate and lower locks. Door 17 is now opened and the workman enters the lower lock, closing the door 17 after him, closing valve 21, and also closing door 15ᶜ. Next valve 22 is opened, which admits the fourteen-pound pressure to the lower lock 15², and the pressure in the lower lock and compartment A, are equalized. Finally door 18 is opened leading to compartment A, and the workman enters therein at the high pressure. It is seen, therefore, that by the operations described, the workman from an atmospheric pressure, enters the several air locks in succession at gradually increasing pressures, and finally gains access to the chamber A, in which the high pressure exists, and this without interfering with the predetermined and varying pressures maintained in the several zones of compartments, compartments C at four pounds pressure, compartments B at nine pounds pressure, and compartment A at fourteen pounds pressure.

In leaving the compartment A through the air locks, the foregoing operations are reversed.

In order that in admitting pressure to the system at successively different degrees as described, the liability of admitting the high pressure first, by inattention or carelessness, will be reduced to a minimum, means may be provided for locking, by means of a lock and key, the gate valves 10ᵃ and 12ᵃ in open position, these valves being released so that they may be closed, only by an attendant authorized to control them. This will insure that when the pressure is first turned on by the ordinary workmen, it will be subject to the active low-pressure valves.

In introducing pressure into the system, it will be understood that the usual and ordinary communications of the compartments with the outside, such as doors, vent openings, hatchways, and the like, are first sealed air-tight. Further it is to be understood that while the operation of the system has been described particularly with reference to the expelling of the water from a leaking compartment, yet the invention is not limited to such use. It may be desired to place the various compartments under pressure in order to ascertain if there is any indication of a leak in any of them. Such tests may be made periodically to insure that the compartments are in watertight or air-tight condition, to the end that when the occasion arises for the application of pressure to a damaged or leaking compartment, the entire system will be in condition to render the operation effective.

In Fig. 9 I have shown instead of a special pipe for introducing the air into the compartment, a construction wherein I utilize for this purpose the ventilating pipe with which compartments are usually equipped. In this figure it will be seen that this ventilating pipe 5ᵃ extends upwardly so that it may be connected with the usual blower or fan, not shown. In making connection with this ventilating pipe I employ a specially constructed coupling 5ᶜ, consisting of a cylindrical sleeve having in one side an opening 5ᵈ, with which the pipe 13 leading from the manifold 8 is connected. Above the opening 5ᵈ the sleeve is provided with a downwardly opening valve 5ᵉ adapted when in an upper position, to close against a valve seat 5ᶠ and close the passage at this point so that the compressed air introduced through the opening 5ᵈ will flow to the connected compartment. When pressure is to be applied in my system, the valve 5ᵉ is closed, but when the pipe 5ᵃ is employed for ventilating purposes, the valve 5ᵉ is thrown down to open position, so that free communication is established between the interior of the compartment and the blower. The valve is fixed at one edge on a rocking stem 5ᵍ mounted in the sleeve, which stem is extended outwardly at one end and has fixed to it a handle 5ʰ, by means of which the valve may be opened or closed. The valve is locked in either position by means of a clamping nut 5ⁱ screwed on a threaded bolt 5ᵏ, carried by a finger 5ˡ, projecting outwardly from the side of the sleeve, the said bolt being extended through a segmental slot 5ᵐ in a plate connected with the handle.

While I have described air under pressure as the medium for reinforcing the compartments, it will be understood that other fluids may be employed for this purpose, provided it is not necessary to enter the compartment in which the fluid is forced, and while I have referred to air under pressure throughout the claims, it is to be understood that an equivalent fluid may be employed, so long as it will answer the objects to be attained.

Having thus described my invention, what I claim is:

1. The method of applying air pressure to ships' compartments to expel water from a leaking compartment and to reinforce said compartment against strains due to internal pressure, which method consists in applying different degrees of air pressure internally to the leaking compartment and surrounding compartments respectively, said pressures being predeterminately selected so that the leaking compartment will receive sufficient pressure to expel water therefrom, and the other compartments will receive a relatively lower pressure to reinforce the walls of the leaking compartment against the strains due to the higher pressure therein.

2. The method of applying air pressure to ships' compartments to expel water from a leaking compartment and to reinforce said compartment against strains due to internal pressure, which method consists in applying different degrees of air pressure internally to the leaking compartment and to the surrounding compartments respectively, said pressures being so predeterminately selected in relation to the hydrostatic pressure acting in the leaking compartment, that the latter will receive a high pressure to overcome the hydrostatic pressure and expel water therefrom, and the other compartments will receive a relatively lower pressure to reinforce the walls of the leaking compartment against the strains of the higher pressure.

3. The method of applying air pressure to ships' compartments to expel water from a leaking compartment and to reinforce said compartment against strains due to internal pressure, which method consists in first applying internally to said leaking compartment and the surrounding compartments, an air pressure less than the highest pressure to be applied, and then increasing the pressure in the leaking compartment, the said different degrees of pressure being predeterminately selected to cause water to be expelled from the leaking compartment, and to cause the walls of the same to be reinforced against the strains of the higher pressure.

4. The method of applying air pressure to ships' compartments to expel water from a leaking compartment and to reinforce said compartment against strains due to internal pressure, which method consists in first applying internally to said leaking compartment and to the surrounding compartments, an air pressure less than the highest pressure to be applied, then increasing the pressure in the compartments immediately surrounding the leaking compartment, and finally increasing to a still higher degree the pressure in the leaking compartment, the several different degrees of pressure being predeterminately selected to cause water to be expelled from the leaking compartment, and to cause the walls of the same and the walls of the compartments immediately surrounding the leaking compartment, to be reinforced against the strains of the pressure therein.

5. In combination with a compartment, a source of air pressure, a connection between the two, and a valve mechanism in said connection, said valve mechanism comprising a plurality of coöperating pressure-controlling valves adapted respectively to be set to admit different predetermined degrees of pressure to said compartment.

6. In combination with a compartment, a source of air pressure, a connection between the compartment and said source of pressure, and a valve mechanism in said connection, said valve mechanism comprising a plurality of automatically acting pressure-controlling valves communicating with each other and with the atmosphere, and means for controlling the communication of said controlling valves with the atmosphere.

7. In combination with a plurality of compartments, a source of air pressure, a connection between said source of pressure and each compartment, and a valve mechanism in each of said connections, said valve mechanisms comprising each a plurality of valves adapted to be set to admit to each compartment at will, different predetermined degrees of pressure.

8. In combination with a plurality of adjoining compartments, air locks associated with said compartments and connected directly with each other, and a door controlling the communication of each air lock with its compartment.

9. In combination with a compartment provided with a ventilating passage, a valve casing connected in said passage and having a valve movable to close the passage, said valve casing being provided with an opening between the valve and the compartment, and a source of air pressure connected with said opening.

10. In combination with a plurality of compartments, a source of air pressure, branch pipes leading to the several compartments, and independent valve mechanisms in the respective branch pipes, said valve mechanisms comprising each a plurality of controlling valves adapted to be set to admit different predeterminate degrees of pressure independently to each compartment.

11. In a ship and in combination with a series of superposed adjoining compartments, means for applying different degrees of air pressure respectively to the interiors of said compartments, an air lock at the end of each compartment, said several air locks being superposed and connected directly with each other, air lock doors controlling the communication of the air locks directly with each other, equalizing valves connecting the air locks with each other, and a door controlling the communication of each air lock with its respective compartment.

12. In combination with a compartment, a source of air pressure, a connection between the two, a manifold in said connection, and a plurality of pressure controlling valves communicating with said manifold, said valves being adapted to be set to admit to the compartment at will, different degrees of pressure.

13. In combination with a compartment, a source of air pressure, a connection between the two, a plurality of pressure controlling valves communicating with said connection and adapted to be set to admit to said compartment at will, different degrees of pressure, and a cut-off valve in said connection between the controlling valves and the source of air pressure.

14. In combination with a compartment, a source of air pressure, a connection between the two, a plurality of valve casings communicating with said connection and communicating also with the atmosphere, pressure controlling valves in said casings opening toward the atmosphere under different predetermined degrees of pressure, and a cut-off valve to shut off communication with the atmosphere.

In testimony whereof I affix my signature in presence of two witnesses.

WILLIAM WALLACE WOTHERSPOON.

Witnesses:
WM. J. DOLAN,
W. R. KENNEDY.